United States Patent [19]

Larkin et al.

[11] Patent Number: 4,766,245

[45] Date of Patent: Aug. 23, 1988

[54] PROCESS FOR THE PREPARATION OF POLYOXYALKYLENE POLYAMINES

[75] Inventors: John M. Larkin; Terry L. Renken, both of Austin, Tex.

[73] Assignee: Texaco Inc., White Plains, N.Y.

[21] Appl. No.: 707,126

[22] Filed: Mar. 1, 1985

[51] Int. Cl.$^4$ .................. C07C 85/02; C07C 85/06
[52] U.S. Cl. .................. 564/474; 564/475; 564/480
[58] Field of Search .................. 564/474, 475, 480

[56] References Cited

U.S. PATENT DOCUMENTS

| | | | |
|---|---|---|---|
| 3,270,059 | 8/1966 | Winderl | 564/475 |
| 3,347,926 | 10/1967 | Zech | 564/480 |
| 3,847,992 | 10/1974 | Hotchkiss | 564/480 |
| 4,181,682 | 1/1980 | Watts, Jr. et al. | 564/474 |

OTHER PUBLICATIONS

*Organic Syntheses,* ed. N. Drake, vol. 21, pp. 15–17 (1941).

*Primary Examiner*—Glennon H. Hollrah
*Assistant Examiner*—John A. Sopp
*Attorney, Agent, or Firm*—Jack H. Park; Kenneth R. Priem

[57] ABSTRACT

An improved method for the manufacture of high molecular weight polyoxyalkylene amines wherein a hydroxy-terminated polyoxyalkylene compound having a molecular weight of at least 500 is reacted with ammonia in the presence of hydrogen and Raney nickel-/aluminum under anhydrous reductive amination conditions to provide the corresponding polyoxyalkylene amine in good yield and selectivity.

The Raney nickel/aluminum is a nickel/aluminum alloy treated with a base, such as sodium hydroxide, so as to only partially leach the aluminum from the alloy, such that the final product contains from about 60 wt. % to about 75 wt. % of nickel and, correspondingly, from about 25 wt. % to about 40 wt. % of aluminum and is preferably used in nugget form.

19 Claims, No Drawings

4,766,245

PROCESS FOR THE PREPARATION OF POLYOXYALKYLENE POLYAMINES

BACKGROUND OF THE INVENTION

1. Technical Field of the Invention

This invention relates to an improved method for the manufacture of high molecular weight polyoxyalkylene amines. More particularly, this invention relates to a method wherein a high molecular weight hydroxyterminated polyoxyalkylene compound is reacted with ammonia in the presence of hydrogen and Raney nickel/aluminum under reductive amination conditions to provide the corresponding polyoxyalkylene amine in good yield and selectivity.

It has been unexpectedly discovered in accordance with the present invention that when Raney nickel/aluminum (i.e., a nickel/aluminum alloy leached with a base, such as sodium hydroxide, to only partially leach the aluminum from the alloy, such that the final product contains from about 60 wt. % to about 75 wt. % of nickel and, correspondingly, from about 25 wt. % to about 40 wt. % of aluminum) is used as the catalyst for the reductive amination of hydroxy-terminated polyoxyalkylene compounds having a molecular weight of about 500 or more, there is a significant improvement in yield and selectivity, as compared with the yields and selectivities normally obtained when reductively aminating corresponding lower molecular weight hydroxy-terminated polyoxyalkylene compounds in the presence of Raney nickel/aluminum.

Although the reductive amination process of the present invention can be conducted batchwise using powdered Raney nickel/aluminum, in accordance with a preferred embodiment of the present invention, the reductive amination process is conducted on a continuous basis using a fixed bed of nuggets of the Raney nickel/aluminum, such as for example, nuggets of Raney nickel/aluminum having a particle size of about 1-10 mm in the longest dimension, a surface area of not more than about 25 m$^2$/gm and a porosity of about 0.01 to about 0.03 cc/gm. In accordance with a preferred form of the present invention, a hydroxy-terminated polyoxyalkylene compound, such as a diol or a triol, having a molecular weight of about 500 to about 10,000 is continuously passed through a bed of Raney nickel/aluminum nuggets in the presence of hydrogen and ammonia under anhydrous reductive amination conditions to provide the corresponding polyoxyalkylene diamine or triamine in good yield and selectivity.

2. Prior Art

Lee et al. U.S. Pat. No. 3,236,895 discloses a process for producing polyoxyalkylene polyamines such as polyoxyalkylene diamines by reacting a polyoxyalkylene diol with ammonia in the presence of hydrogen. Examples 8-14 are specifically directed to the reaction of a polypropylene glycol with ammonia in the presence of added hydrogen and a conventional Raney nickel catalyst. The yield of desired product range from about 40 to about 70%.

Horlenko et al. U.S. Pat. No. 3,215,742 also discloses the preparation of alkylene diamines, and more particularly, the preparation of hexamethylene diamine from 1,6-hexanediol by reacting the diol with ammonia in the presence of Raney nickel.

Zech U.S. Pat. No. 3,347,926 discloses an ammonolysis process for preparing aliphatic amines from hydroxy-containing feedstocks with an aminating agent in the presence of a Raney nickel catalyst containing a minor amount of chromium.

Yeakey U.S. Pat. No. 3,654,370 is directed to a process for the preparation of polyoxyalkylene polyamines wherein a polyoxyalkylene polyol is reacted with ammonia in the presence of hydrogen and a catalyst prepared by the reduction of a mixture of the oxides of nickel, copper and chromium.

European patent application No. 0022532 discloses the use of pelleted Raney nickel in a continuous process for the reductive amination of a low molecular weight compound such as neopentyl alcohol to provide the corresponding neopentyl amine. The normally to be expected low yields and selectivies are reported.

European patent application 0081701A1 discloses the use of conventional Raney nickel in the amination of a 6000 molecular weight polyether triol. Conversion to amino groups is only 80%.

SUMMARY OF THE INVENTION

This invention is directed to an improved method for the manufacture of high molecular weight polyoxyalkylene amines wherein a high molecular weight hydroxy-terminated polyoxyalkylene compound is reacted with ammonia in the presence of hydrogen and Raney nickel/aluminum under anhydrous reductive amination conditions to provide the corresponding polyoxyalkylene amine in good yield and selectivity.

Thus, Raney nickel/aluminum (i.e., a nickel/aluminum alloy treated with a base, such as sodium hydroxide, so as to only partially leach the aluminum from the alloy, such that the final product contains from about 60 wt. % to about 75 wt. % of nickel and, correspondingly, from about 25 wt. % to about 40 wt. % of aluminum), preferably in nugget form, is used as the catalyst for the reductive amination of hydroxy-terminated polyoxyalkylene compounds having a molecular weight of about 500 or more, to thereby provide the corresponding polyoxyalkylene amines in good yield and with good selectivity.

DETAILED DESCRIPTION

Catalyst Composition

The catalyst composition to be used in accordance with the present invention is a form of Raney nickel that is more accurately denominated "Raney nickel/aluminum" in order to distinguish it from the "conventional" form of Raney nickel that contains not more than about 10 wt. % of aluminum. Both Raney nickel and "Raney nickel/aluminum" are proprietary products manufactured by W. R. Grace & Co. by leaching aluminum from an aluminum-nickel alloy with a base such as caustic soda. However, substantially all of the alumunium is leached from the nickel-aluminum alloy when making conventional Raney nickel, such that the final product contains less than about 10 wt. % of aluminum. In contrast, the Raney nickel/aluminum that is used in accordance with the present invention contains at least about 25 wt. % of aluminum. The Raney nickel/aluminum catalysts of the present invention should suitably contain about 60 to 75 wt. % of nickel and 25 to 40 wt. % of aluminum. More preferably, the Raney nickel/aluminum will contain from about 65 wt. % to about 75 wt. % of nickel and, correspondingly, from about 25 wt. % to about 35 wt. % of aluminum.

The Raney nickel/aluminum may be used in powdered form in conducting the process of the present invention batchwise, but the Raney nickel/aluminum is preferably used in the form of a fixed bed for continuous operations as a fixed bed containing "nuggets" of Raney nickel/aluminum (i.e., unpowdered chunks or lumps of Raney nickel/aluminum) having a particle size of about 1 mm to 20 mm, such that the nuggets are at least 1 mm in length in their longest dimension, and preferably about 1 to 10 mm in their longest dimension. The surface area of powdered Raney nickel is normally from about 80 to 100 $m^2/g$, whereas the surface area of the Raney nickel/aluminum of the present invention will normally be about 25 $m^2/g$ or less. The Raney nickel/aluminum nuggets also have a comparatively low porosity of about 0.01 to about 0.03 cc/g.

The general expectation is that reaction rates will become slower as the molecular weight of the feed increases. Also, high catalyst activity is normally associated with high surface area and high porosity. Contrary to these expectations, it has been discovered that when the process of the present invention is conducted on a continuous basis using a reactor containing a fixed bed of Raney nickel/aluminum nuggets, the high molecular weight hydroxy-terminated polyoxyalkylene feedstock may be passed through the bed in the presence of ammonia and hydrogen under reductive amination conditions with a high hourly throughput and with no significant problem of catalyst carryover. The reaction rates are unexpectedly faster with the higher molecular weight feedstocks of the present invention than with low molecular weight feedstocks.

The Polyoxyalkylene Polyol Feedstock

The polyoxyalkylene polyol feedstocks to be used in accordance with the present invention are hydroxy-terminated polyoxyalkylene compounds prepared by the reaction of an epoxide such as ethylene oxide, propylene oxide, or butylene oxide, with an initiator to form a hydroxy terminated alkoxylation product. Preferred feedstocks include hydroxy-terminated polyoxypropylene and poly(oxyethylene-oxypropylene) compounds diols and triols. However, the functionality of the feedstock is not critical to the practice of the present invention. Thus, compounds as diverse as monoalkyl ethers of polyoxypropylene glycols, tetrols, hexols, etc. may be used. However, it is important that the feedstock have an average molecular weight of at least about 500 and, more preferably, have an average molecular weight of from about 500 to about 10,000, such as an average molecular weight of about 1,000 to about 8,000.

The monoalkyl glycol ethers that may be used as feedstocks in accordance with the present invention may be generally characterized by the following formula:

$$R'-[O-CH_2-CH]_x-OH \qquad (I)$$
$$\phantom{R'-[O-CH_2-}R$$

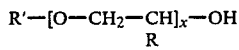

wherein:
  R' represents a $C_1$ to $C_{12}$ alkyl group,
  R represents hydrogen, methyl, ethyl, propyl and/or butyl, and
  x is a positive integer having a value of from about 4 to 100, with the proviso that the minimum molecular weight of the molecule be about 500.

The diol feedstocks to be used in accordance with the present invention may be generally characterized by the following formula:

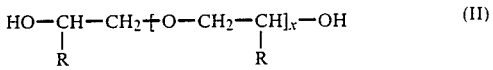

$$HO-CH-CH_2\!\!+\!\!O-CH_2-CH]_x-OH \qquad (II)$$
$$\phantom{HO-C}R \phantom{H_2\!\!+\!\!O-CH_2-}R$$

Wherein

R represents hydrogen and/or methyl, ethyl or butyl and x is a positive integer having a value from about 3 to about 170, with the proviso that the minimum molecular weight of the molecule be at least about 500.

Examples of feedstocks of this nature include polyoxypropylene diols such as polyoxypropylene diols having the following formula:

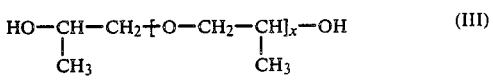

$$HO-CH-CH_2\!\!+\!\!O-CH_2-CH]_x-OH \qquad (III)$$
$$\phantom{HO-C}CH_3 \phantom{H_2\!\!+\!\!O-CH_2-}CH_3$$

Wherein x represents an integer having a value of from about 3 to about 100 with the proviso that the minimum molecular weight of the molecule be at least about 500.

Examples of feedstocks having the formula II structure include polyoxypropylene diols having an average molecular weight of about 500 or more wherein x has a value of about 6 to 7, polyoxypropylene diols having an average molecular weight of about 2000 wherein x has an average value of about 33 and polyoxypropylene diols having an average molecular weight of about 4000 wherein x has an average value of about 60.

As another example, the polyoxyalkylene diol feedstock may be a feedstock having the following formula:

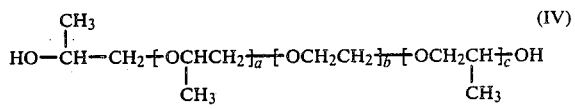

Wherein:
  b has a value of about 8 to about 100 and a+c have a value of about 2 to about 3.

Examples of feedstocks having formula IV include the following:

| | PRODUCT | |
|---|---|---|
| Approximate | Approximate Value | |
| Mol. Wt. | b | a + c |
| 600 | 8.5 | 2.5 |
| 900 | 15.5 | 2.5 |
| 2000 | 40 | 2.5 |
| 4000 | 86 | 2.5 |

Another class of preferred feedstocks are polyoxyalkylene triols such as those having the following formula:

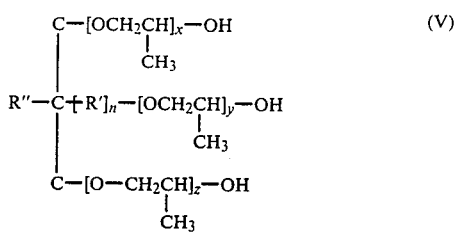

Wherein

R' represents a methylene group and R'' represents hydrogen or methyl, and wherein n is 0 when R' and R'' represent hydrogen and 1 when R'' represents methyl, and R' represents a methylene group, and wherein the sum of $x+y+z$ is a positive integer having a value of from about 5 to about 170 with the proviso that the average molecular weight of the molecule be about 500. Specific examples of compounds having formula V are listed below.

| Approximate Mol. Wt. | PRODUCT | | | |
|---|---|---|---|---|
| | R'' | R' | n | x + y + z |
| 500 | —CH$_3$ | —CH$_2$— | 1 | 7 |
| 5000 | H | — | 0 | 85 |

Another class of feedstocks that may be used in accordance with the present invention are tetrols, pentols, hexols and heptols having the following formula:

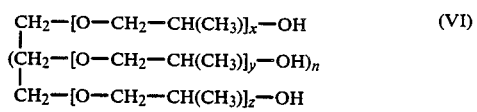

Wherein n is a positive integer having a value of about 2 to 5, and wherein the sum of $x+y+z$ has a value of about 7 to 170.

Preparation of Polyoxyalkylene Polyamines

As indicated, the polyoxyalkylene polyamine products of the present invention are prepared by reacting a polyoxyalkylene polyol feedstock with ammonia in the presence of hydrogen and Raney nickel/aluminum under reductive amination conditions.

The reductive amination conditions to be utilized will suitably include the use of from about 4 to about 150 moles of ammonia per hydroxyl equivalent of feedstock, and from about 0.5 to about 10 mole equivalents of hydrogen per hydroxyl equivalent of feedstock.

Reaction conditions to be used may suitably include a temperature within the range of about 150°–280° C. and, more preferably, from about 170°–250° C.

The pressure may suitably be within the range from about 500 to about 10,000 psig. and, more preferably in the range from about 1000 to about 4000 psig. Contact times when the reaction is conducted on a batch basis may suitably be within the range of from about 0.1 to about 6 hours and, more particularly, from about 0.15 to about 2 hours.

When the reaction is conducted on a continuous basis using catalyst nuggets, reaction time may suitably be from about 0.1 to about 2.0 grams of feedstock per hour per cubic centimeter of catalyst and, more preferably, from about 0.3 to about 1.6 grams of feedstock per hour per cubic centimeter of catalyst.

The invention will be further illustrated by the following specific examples which are given by way of illustration and not as limitations on the scope of this invention.

EXAMPLE 1

(5838-63)

To a tubular reactor containing approximately 95 cm$^3$ of nominal ¼" Raney nickel/aluminum nuggets, there was simultaneously fed polypropylene glycol of 2000 molecular weight at 0.105 lb/hr, ammonia at 0.112 lb/hr, and hydrogen at 8 /hr. The reactor was maintained at 200° C. and 2000 psig. A sample of effluent, when stripped at 98° C./30 mm Hg on a rotary evaporator was analyzed as follows: 1.03 meq/g total acetylatables, 0.87 meq/g total amines, and 0.86 meq/g primary amines.

The reactor was operated in essentially the same manner but at temperatures of 210°, 220°, and 230° C. Exact conditions and analyses of stripped effluents are tabulated below:

TABLE 1

| | lb/hr | | meq/g | | |
|---|---|---|---|---|---|
| °C. | PPG-2000 | NH$_3$ | Tot. Acetyl. | Tot. Amine | Prim. Amine |
| 210 | 0.108 | 0.109 | 1.03 | 0.95 | 0.94 |
| 220 | 0.107 | 0.107 | 1.00 | 0.97 | 0.96 |
| 230 | 0.108 | 0.103 | 1.00 | 0.98 | 0.97 |

EXAMPLES 2–6

(5868-66, 5868-67, 5868-74, 5868-77, 5868-81)

The reactor containing the raney nickel catalyst was operated in accord with conditions listed in Table II. Analytical results for these examples as well as conditions and analytical results for Example 1 are also shown in Table II.

The catalyst had been in service for 147 hours after the last run of Table II. The physical condition was identical to that when charged. As can be seen by the last table entry (5838-81-3), activity of the catalyst was excellent.

As can be seen by examining the data in Tables I and II, a 2,000 molecular weight polyoxypropylene diamine was prepared at high conversion and selectivity at high diol feed rates.

EXAMPLE 7

(5777-77)

The reactor catalyst bed used for this experiment contained pelleted Ni/Cu/Cr catalyst of the same composition as that used by Yeakey in U.S. Pat. No. 3,654,370 (75 mol % nickel, 23 mol % copper and 2 mol % chromium). The reactor was operated in accord with conditions listed in Table III. It can be noted that conversions are lower even at lower feed rates than for runs conducted at similar temperatures and pressures in Table II.

TABLE II

Raney Ni Chunk Catalyst; 100 cc Reactor

| Material Ref. No. | Temp °C. | Pres. psig | Polyol wt. sv. g/cc/hr | Wt % Ammonia | Total wt. sv. g/cc/hr | SCF H$_2$/ lb diol | Mol H$_2$/ Eq —OH | Mol NH$_3$/ Eq —OH | Total Acetyl meq/g | % Conv | % Prim Amine |
|---|---|---|---|---|---|---|---|---|---|---|---|
| 5838-63-1 | 200 | 2000 | .50 | 51.60 | 1.04 | 2.70 | 7.50 | 62.60 | 1.03 | 84.50 | 83.50 |
| 5838-63-2 | 210 | 2000 | .52 | 50.20 | 1.04 | 2.60 | 7.30 | 59.30 | 1.03 | 92.20 | 91.30 |
| 5838-63-3 | 220 | 2000 | .51 | 50.00 | 1.03 | 2.60 | 7.40 | 58.70 | 1.00 | 97.00 | 96.00 |
| 5838-63-4 | 230 | 2000 | .52 | 48.80 | 1.01 | 2.60 | 7.30 | 56.00 | 1.00 | 98.00 | 97.00 |
| 5838-66-1 | 210 | 2000 | .54 | 48.20 | 1.05 | 1.20 | 3.50 | 54.60 | 1.00 | 95.00 | 94.00 |
| 5838-66-2 | 210 | 2000 | .55 | 50.60 | 1.13 | 3.70 | 10.20 | 60.20 | 1.03 | 88.30 | 87.40 |
| 5838-67-1 | 200 | 2000 | .68 | 49.10 | 1.35 | 2.00 | 5.50 | 56.70 | 1.03 | 75.70 | 74.80 |
| 5838-67-2 | 210 | 2000 | .65 | 49.10 | 1.28 | 2.10 | 5.80 | 56.60 | .99 | 90.90 | 89.90 |
| 5838-67-3 | 220 | 2000 | .66 | 49.10 | 1.30 | 2.00 | 5.70 | 56.60 | 1.00 | 99.00 | 98.00 |
| 5838-67-4 | 230 | 2000 | .70 | 48.60 | 1.37 | 1.90 | 5.40 | 55.50 | 1.02 | 96.10 | 95.10 |
| 5838-74-4 | 230 | 1950 | .85 | 49.90 | 1.69 | 1.60 | 4.40 | 58.40 | 1.02 | 94.10 | 93.10 |
| 5838-74-1 | 215 | 2000 | .86 | 49.00 | 1.70 | 1.60 | 4.30 | 56.40 | 1.02 | 89.20 | 88.20 |
| 5838-74-2 | 220 | 2000 | .86 | 50.00 | 1.73 | 1.60 | 4.30 | 58.70 | 1.00 | 93.00 | 92.00 |
| 5838-74-3 | 225 | 2000 | .85 | 49.10 | 1.67 | 1.60 | 4.40 | 56.70 | 1.00 | 95.00 | 94.00 |
| 5838-77-1 | 225 | 2000 | .94 | 51.70 | 1.95 | 1.80 | 5.00 | 62.90 | 1.01 | 90.10 | 89.10 |
| 5838-77-2 | 230 | 2000 | 1.02 | 51.40 | 2.11 | 1.70 | 4.60 | 62.00 | 1.03 | 91.30 | 90.30 |
| 5838-77-3 | 235 | 2000 | 1.01 | 49.00 | 2.00 | 1.70 | 4.60 | 56.50 | 1.03 | 92.20 | 91.30 |
| 5838-81-1 | 225 | 2000 | 1.01 | 57.10 | 2.36 | 1.70 | 4.70 | 78.20 | 1.03 | 90.30 | 89.30 |
| 5858-81-2 | 230 | 2000 | 1.02 | 56.30 | 2.35 | 1.70 | 4.60 | 75.70 | 1.02 | 93.10 | 92.20 |
| 5858-81-3 | 235 | 2000 | .99 | 55.00 | 2.22 | 1.70 | 4.70 | 71.70 | 1.02 | 93.10 | 92.20 |

TABLE III

Ni/Cu/Cr Catalyst

| Material Ref. No. | Temp °C. | Pres. psig | Polyol wt. sv. g/cc/hr | Wt. % Ammonia | Total wt. sv. g/cc/hr | SCF H$_2$/ lb diol | Mol H$_2$/ Eq —OH | Mol NH$_3$/ Eq —OH | Total acetyl meq/g | % Conv | % Prim Amine |
|---|---|---|---|---|---|---|---|---|---|---|---|
| 5777-77-2 | 200 | 1975 | .53 | 51.10 | 1.09 | 2.50 | 7.10 | 61.40 | 1.00 | 81.00 | 80.00 |
| 5777-77-3 | 210 | 2000 | .52 | 50.70 | 1.06 | 2.60 | 7.20 | 60.30 | 1.04 | 84.60 | 82.70 |
| 5777-77-4 | 220 | 2000 | .51 | 52.50 | 1.07 | 2.70 | 7.40 | 64.80 | 1.04 | 92.30 | 90.40 |
| 5777-77-5 | 230 | 2000 | .50 | 50.70 | 1.02 | 2.70 | 7.50 | 60.40 | 1.06 | 93.40 | 89.60 |
| 5777-77-6 | 240 | 2000 | .55 | 47.50 | 1.05 | 2.50 | 6.80 | 53.10 | 1.05 | 87.60 | 82.90 |
| 5777-77-7 | 190 | 2050 | .48 | 51.20 | 1.00 | 2.80 | 7.80 | 61.60 | .99 | 67.70 | 66.70 |

EXAMPLES 8, 9, 10

(5868-43, 5868-44, 5868-46)

The reactor containing Raney nickel/aluminum nuggets of 6-8 mesh size was operated in accord with conditions listed in Table IV. The results shown in Table IV indicate that this catalyst is even more active than the ¼" granules of Examples 1-6. After approximately 60 hours use, the used catalyst was in excellent physical condition with about 1% fine particles generated.

EXAMPLES 11, 12

(5868-22, 5868-26)

A larger reactor containing 1100 cc. of another batch of ¼" Raney nickel/aluminum catalyst nuggets (different from Examples 1-6) was operated in accord with conditions listed in Table V. The results indicate that although this particular batch of catalyst is less active than that used for Examples 1-6, its activity is at least as good as the Ni/Cu/Cr catalyst of Example 7.

EXAMPLE 13

(5868-31)

The reactor and catalyst system of Examples 11-12 was operated using a 5000 molecular weight polypropylene glycol containing three terminal hydroxy groups. Operation was in accord with conditions listed in Table VI. It can be seen that this polyol is also converted to a polyamine using this catalyst.

TABLE IV

Raney Nickel, 6 × 8 Mesh

| Material Ref. No. | Temp °C. | Pres. psig | Polyol wt. sv. g/cc/hr | Wt. % Ammonia | Total wt. sv. g/cc/hr | SCF H$_2$/ lb diol | Mol H$_2$/ Eq —OH | Mol NH$_3$/ Eq —OH | Total Acetyl meq/g | % Conv. | % Prim Amine |
|---|---|---|---|---|---|---|---|---|---|---|---|
| 5868-43-1 | 200 | 2000 | .67 | 49.10 | 1.32 | 1.90 | 5.30 | 56.50 | 1.01 | 81.20 | 80.40 |
| 5868-43-2 | 210 | 2000 | .67 | 49.90 | 1.34 | 1.90 | 5.30 | 58.40 | 1.01 | 91.10 | 90.10 |
| 5868-43-3 | 220 | 2000 | .68 | 50.20 | 1.36 | 1.90 | 5.30 | 59.10 | 1.02 | 94.10 | 93.10 |
| 5868-44-1 | 215 | 1950 | .83 | 48.80 | 1.62 | 1.50 | 4.30 | 55.90 | 1.01 | 93.10 | 92.10 |
| 5868-44-2 | 220 | 1950 | .79 | 49.20 | 1.56 | 1.60 | 4.50 | 56.90 | 1.01 | 95.00 | 94.10 |
| 5868-44-3 | 225 | 2000 | .77 | 49.60 | 1.54 | 1.70 | 4.60 | 57.80 | 1.02 | 94.10 | 93.10 |
| 5868-44-4 | 230 | 2000 | .75 | 50.00 | 1.51 | 1.70 | 4.70 | 58.70 | 1.01 | 96.00 | 95.00 |
| 5868-46-1 | 225 | 2050 | 1.03 | 54.90 | 2.29 | 1.60 | 4.30 | 71.50 | 1.04 | 91.30 | 90.40 |
| 5868-46-2 | 230 | 2000 | 1.03 | 55.80 | 2.35 | 1.60 | 4.30 | 74.30 | 1.00 | 96.00 | 95.00 |
| 5868-46-3 | 235 | 2050 | 1.01 | 56.40 | 2.33 | 1.60 | 4.40 | 75.90 | 1.01 | 96.00 | 95.00 |

TABLE V

| Material Ref. No. | Temp °C. | Pres. psig | Polyol wt. sv. g/cc/hr | Wt. % Ammonia | Total wt. sv. g/cc/hr | SCF H₂/ lb diol | Mol H₂/ Eq —OH | Mol NH₃/ Eq —OH | Total Acetyl meq/g | % Conv | % Prim Amine |
|---|---|---|---|---|---|---|---|---|---|---|---|
| 5868-22-1 | 200 | 2100 | .56 | 57.90 | 1.34 | 1.40 | 4.00 | 80.70 | 1.00 | 55.00 | 54.00 |
| 5868-22-2 | 200 | 2100 | .77 | 52.60 | 1.62 | 1.10 | 3.20 | 65.00 | 1.00 | 42.00 | 40.00 |
| 5868-22-3 | 210 | 2100 | .74 | 52.90 | 1.57 | 1.20 | 3.30 | 65.90 | 1.02 | 61.80 | 60.80 |
| 5868-22-4 | 220 | 2100 | .72 | 53.30 | 1.55 | 1.20 | 3.40 | 67.10 | .99 | 74.70 | 73.70 |
| 5868-22-5 | 230 | 2100 | .69 | 54.60 | 1.53 | 1.30 | 3.50 | 70.60 | 1.01 | 85.10 | 84.20 |
| 5868-26-1 | 220 | 2100 | .70 | 54.10 | 1.53 | 2.00 | 5.50 | 69.10 | 1.01 | 66.30 | 65.30 |
| 5868-26-2 | 230 | 2100 | .73 | 52.90 | 1.55 | 1.90 | 5.30 | 66.10 | 1.01 | 76.20 | 75.20 |
| 5868-26-3 | 220 | 2100 | .75 | 52.70 | 1.59 | .90 | 2.40 | 65.50 | .99 | 69.70 | 68.70 |
| 5868-26-4 | 230 | 2100 | .73 | 53.10 | 1.56 | .90 | 2.50 | 66.40 | .99 | 82.80 | 81.80 |
| 5868-26-5 | 235 | 2100 | .72 | 52.80 | 1.53 | 1.20 | 3.40 | 65.80 | 1.00 | 85.00 | 84.00 |

TABLE VI

| Material Ref. No. | Temp °C. | Pres. psig | Polyol wt. sv. g/cc/hr | Wt. % Ammonia | Total wt. sv. g/cc/hr | SCF H₂/ lb diol | Mol H₂/ Eq —OH | Mol NH₃/ Eq —OH | Total Acetyl meq/g | % conv | % Prim Amine |
|---|---|---|---|---|---|---|---|---|---|---|---|
| 5868-31-1 | 225 | 2100 | .61 | 51.20 | 1.25 | 1.30 | 6.10 | 102.50 | .55 | 70.90 | 69.10 |
| 5868-31-2 | 230 | 2100 | .61 | 51.50 | 1.25 | 1.30 | 6.10 | 103.80 | .57 | 73.70 | 71.90 |
| 5868-31-3 | 235 | 2100 | .52 | 55.20 | 1.15 | 1.60 | 7.20 | 120.50 | .55 | 87.30 | 85.50 |

TABLE VII

| Material Ref. No. | Temp °C. | Pres. psig | Polyol wt. sv. g/cc/hr | Wt. % Ammonia | Total wt. sv. g/cc/hr | SCF H₂/ lb diol | Mol H₂/ Eq —OH | Mol NH₃/ Eq —OH | Total Acetyl meq/g | % Conv | % Prim Amine |
|---|---|---|---|---|---|---|---|---|---|---|---|
| 5868-32-1 | 205 | 2100 | .51 | 51.40 | 1.06 | 1.30 | .40 | 7.10 | 8.78 | 54.80 | 54.30 |
| 5868-32-2 | 210 | 2100 | .51 | 52.70 | 1.08 | 1.30 | .40 | 7.50 | 8.67 | 64.10 | 63.20 |
| 5868-32-3 | 217 | 2100 | .51 | 52.50 | 1.07 | 1.30 | .40 | 7.50 | 8.69 | 75.90 | 74.80 |

EXAMPLE 14

(586832)

The reactor and catalyst system of Examples 11–13 was operated using a 230 molecular weight polyproylene glycol containing two terminal hydroxyl groups. Operation was in accord with conditions listed in Table VII. This behavior is in accord with prior art aminations of lower molecular weight alkanols over Raney nickel. Conversions were lower than for the 5,000 molecular weight polyol even at lower diol feed rates.

EXAMPLE 15

(5868-23)

Commercial Raney nickel catalyst (Grace 2800) was made anhydrous by repeated washing of the wet catalyst with t-butylamine followed by drying in a nitrogen atmosphere. A one liter stirred autoclave was charged with 417.79 g of the 5000 mol. wt. polyol of Example 13, 50.16 g of the anhydrous catalyst, and 88.4 g of NH₃. The autoclave was flushed with hydrogen and hydrogen pressure applied at room temperature sufficient to achieve 450 psig. The autoclave was heated rapidly to 245° C. and temperature was maintained at 242°–250° C. (average ~248° C.) for 26 minutes. Pressure was 2690–2700 psig. The clave was cooled rapidly to room temperature. A portion of contents were filtered and stripped (rotary evaporator, 98° C., 25 mm Hg). Analysis indicated 0.59 meq/g total acetylatables, 0.57 meq/g total amines, and 0.56 meq/g primary amines.

This example illustrates the rapid conversion of a high molecular weight polyoxypropylene glycol using a conventional Raney nickel catalyst.

EXAMPLE 16

(5838-84)

The essential procedure of Example 15 was used except the catalyst was not anhydrous; it was wet with water as received from the manufacturer. The amount of catalyst was 69.5 g, the amount of polyol was 162.5 g, and the amount of NH₃ was 119.7 g. Reaction temperature of 225° C. was maintained for 1.5 hours. Pressure was 3010 psig. Analysis of the product indicated 0.63 meq/g total acetylatables, 0.14 meq/g total amines, and 0.12 meq/g primary amines.

This example illustrates the need to conduct the reductive amination reaction in the essential absence of water.

EXAMPLE 17

(5868-6)

Example 16 was essentially repeated except the catalyst was anhydrous Raney Ni and 45.2 g were used. Product analysis indicated 0.62 meq/g total acetylatables, 0.57 meq/g total amines, and 0.56 meq/g primary amines.

EXAMPLE 18

A polypropylene glycol of approximately 8,000 molecular weight made by multiple additions of propylene oxide to sucrose was pumped at 0.74 lbs/hr together with ammonia at 1.11 lb/hr and hydrogen at 50 liters/hr through a tublular reactor containing 1,200 cc of 6×.8 mesh Raney nickel/aluminum granules. The temperature and pressure were maintained at about 215° C. and 2,100 psig, respectively. Analysis of the liquid effluent after it was stripped at 98 deg, C/30 mm Hg indicated 1.02 meg/g acetylatables, 0.98 meg/g total amines and 0.97 meg/g primary amines.

Having thus described our invention, what is claimed is:

1. A method which comprises contacting a hydroxy-terminated polyoxyalkylene compound having a molecular weight of at least about 500 with ammonia and hydrogen in the presence of a catalyst under anhydrous reductive amination conditions to at least partially convert said compound to the corresponding amine, said catalyst being a aney nickel/aluminum catalyst containing about 60 wt. % to about 75 wt. % of nickel and, correspondingly, about 40 wt. % to about 25 wt. % of aluminum.

2. A method as in claim 1 wherein said compound has the formula:

$$R'-[O-CH_2-CH]_x-OH \quad (I)$$
$$\quad\quad\quad\quad\quad R$$

wherein:
R' represents a $C_1$ to $C_{12}$ alkyl group,
R represents hydrogen, methyl, ethyl, propyl and/or butyl, and
x is a positive integer having a value of from about 4 to 100, with the proviso that the minimum molecular weight of the molecule be about 500.

3. A method as in claim 1, wherein said compound has the formula:

$$HO-CH-CH_2+O-CH_2-CH]_x-OH \quad (II)$$
$$\quad\quad | \quad\quad\quad\quad\quad\quad\quad\quad |$$
$$\quad\quad R \quad\quad\quad\quad\quad\quad\quad\quad R$$

wherein
R represents hydrogen or methyl, ethyl or butyl and
x is a number having a value from about 3 to about 170, with the proviso that the minimum molecular weight of the molecule be at least about 500.

4. A method as in claim 1, wherein said compound has the formula:

$$HO-CH-CH_2+O-CH_2-CH]_x-OH \quad (III)$$
$$\quad\quad | \quad\quad\quad\quad\quad\quad\quad\quad\quad |$$
$$\quad\quad CH_3 \quad\quad\quad\quad\quad\quad\quad\quad CH_3$$

wherein
x represents a number having a value of from about 6 to about 100, with the proviso that the minimum molecular weight of the molecule be at least about 500.

5. A method as in claim 4, wherein x has a value of about 33.

6. A method as in claim 1, wherein said compound has the formula:

$$\quad\quad CH_3 \quad\quad\quad\quad\quad\quad\quad\quad\quad\quad\quad (IV)$$
$$\quad\quad |$$
$$HO-CH-CH_2+OCHCH_2]_a+OCH_2CH_2]_b+OCH_2CH]_c OH$$
$$\quad\quad\quad\quad\quad | \quad\quad\quad\quad\quad\quad\quad\quad\quad\quad\quad\quad |$$
$$\quad\quad\quad\quad\quad CH_3 \quad\quad\quad\quad\quad\quad\quad\quad\quad\quad\quad CH_3$$

wherein
b has a value of from about 8 to about 100 and a+c have a value of about 2 to about 3.

7. A method as in claim 1, wherein said compound has the formula:

$$\quad\quad C-[OCH_2CH]_x-OH \quad (V)$$
$$\quad\quad\quad\quad | $$
$$\quad\quad\quad\quad CH_3$$
$$\quad\quad |$$
$$R''-C+R']_n-[OCH_2CH]_y-OH$$
$$\quad\quad |\quad\quad\quad\quad\quad\quad | $$
$$\quad\quad\quad\quad\quad\quad\quad\quad CH_3$$
$$\quad\quad |$$
$$\quad\quad C-[O-CH_2CH]_z-OH$$
$$\quad\quad\quad\quad\quad | $$
$$\quad\quad\quad\quad\quad CH_3$$

wherein
R' represents a methylene group and R" represents hydrogen or methyl, wherein n has a value of 0 to 1, and wherein the sum of x+y+z has a value within the range of about 5 to about 100.

8. A method as in claim 7, wherein n has a value of 1, R' represents a methylene group, R" represents methyl and the sum of x+y+z represents about 7.

9. A method as in claim 7, wherein the polyol has a molecular weight of about 5000 wherein n represents 0, R" represents H and x+y+z represent about 85.

10. A method which comprises the steps of continuously contacting a hydroxy-terminated polyoxyalkylene compound having a molecular weight of about 500 to about 10,000 with from about 4 to about 150 mole equivalents of ammonia and from about 0.5 to about 10 mole equivalents of hydrogen under anhydrous conditions in a reactor containing a fixed bed of catalyst at a temperature within the range of about 150° to about 280° C. and a pressure within the range of about 500 to about 10,000 psig for a time adequate to convert at least a portion of said compound to the corresponding polyoxyalkylene amine,
said catalyst bed containing a bed of Raney nickel/aluminum nuggets containing about 60 wt. % to about 75 wt. % of nickel and, correspondingly, about 25 wt. % to about 40 wt. % of aluminum,
said Raney nickel/aluminum nuggets having a surface area of not more than about 25 $m^2$/g, a porosity of about 0.01 to about 0.03 cc/g. and a particle size of about 1 mm to about 20 mm;
the oxyalkylene groups of said compound being derived from ethylene oxide, propylene oxide, butylene oxide and mixtures thereof.

11. A method as in claim 10, wherein the reaction conditions include a temperature within the range of about 170° to about 250° C. and a pressure within the range of about 1,000 to about 4,000 psig.

12. A method as in claim 11, wherein said compound has the formula:

$$R'-[O-CH_2-CH]_x-OH \quad (I)$$
$$\quad\quad\quad\quad\quad R$$

wherein:
R' represents a $C_1$ to $C_{12}$ alkyl group,
R represents hydrogen, methyl, ethyl, propyl and/or butyl, and
x is a positive integer having a value of from about 4 to 100, with the proviso that the minimum molecular weight of the molecule be about 500.

13. A method as in claim 11, wherein said compound has the formula:

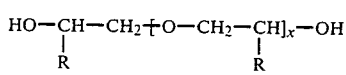  (II)

wherein

R represents hydrogen or methyl, ethyl or butyl and x is a number having a value from about 3 to about 170 with the proviso that the minimum molecular weight of the molecule be at least about 500.

14. A method as in claim 11, wherein said compound has the formula:

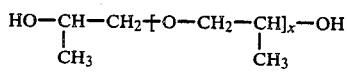  (III)

wherein x represents a number having a value of from about 6 to about 100, with the proviso that the minimum molecular weight of the molecule be at least about 500.

15. A method as in claim 14, wherein x has a value of about 33.

16. A method as in claim 11, wherein the compound has the formula:

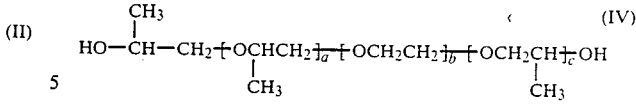  (IV)

wherein b has a value of from about 8 to about 100 and a+c have a value of about 2 to about 3.

17. A method as in claim 11, wherein the compound has the formula:

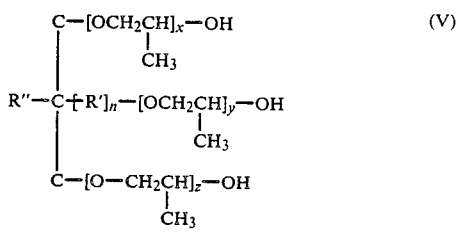  (V)

wherein

R' represents a methylene group and R" represents hydrogen or methyl, wherein n has a value of 0 to 1, and wherein the sum of x+y+z has a value within the range of about 5 to about 100.

18. A method as in claim 17, wherein n has a value of 1, R' represents a methylene group, R" represents methyl and the sum of x+y+z represents about 6.

19. A method as in claim 17, wherein the polyol has a molecular weight of about 5000 wherein n represents 0, R" represents H and x+y+z represent about 85.

* * * * *